A. WALTER.
HARVESTER-CUTTER.
No. 191,207. Patented May 22, 1877.
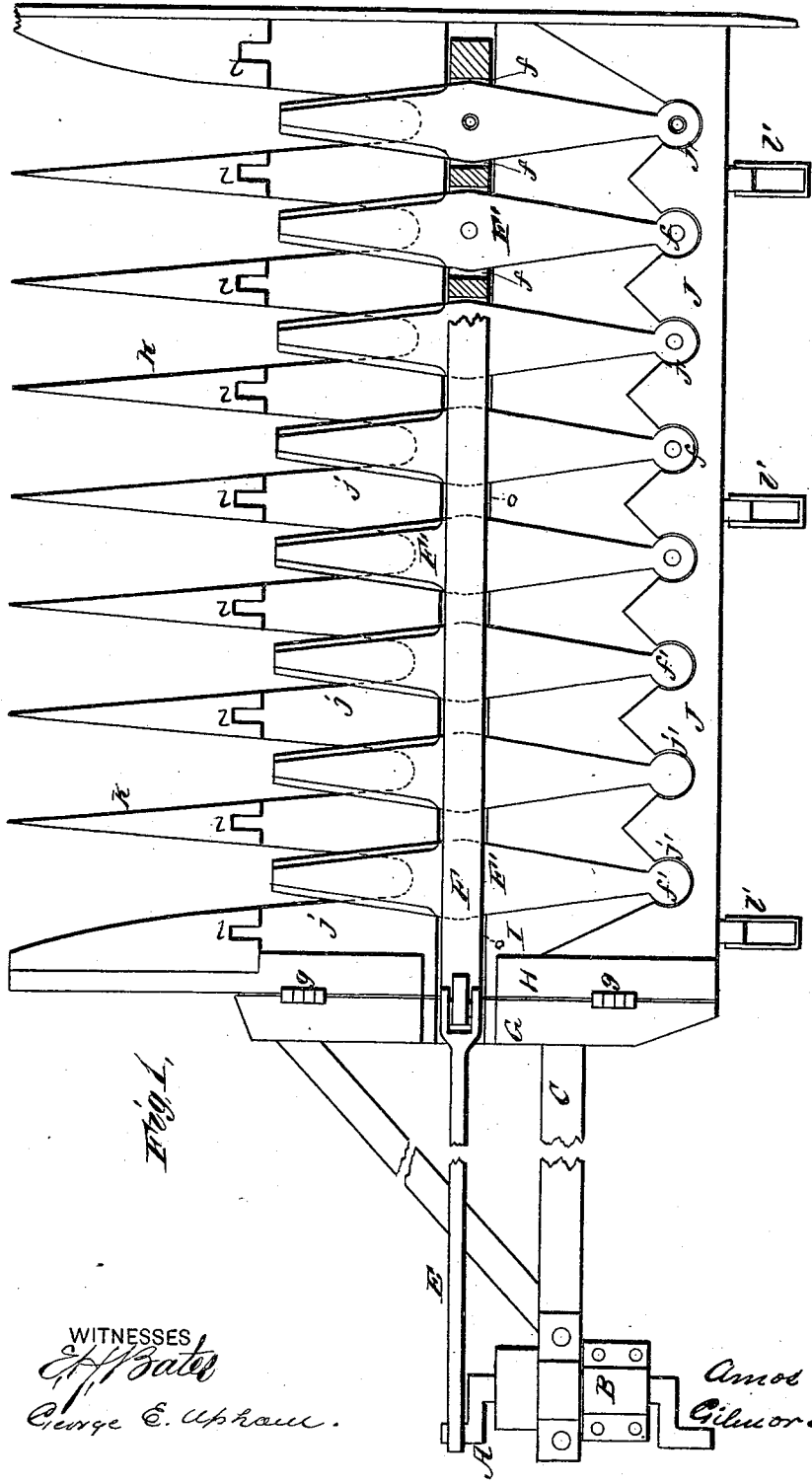

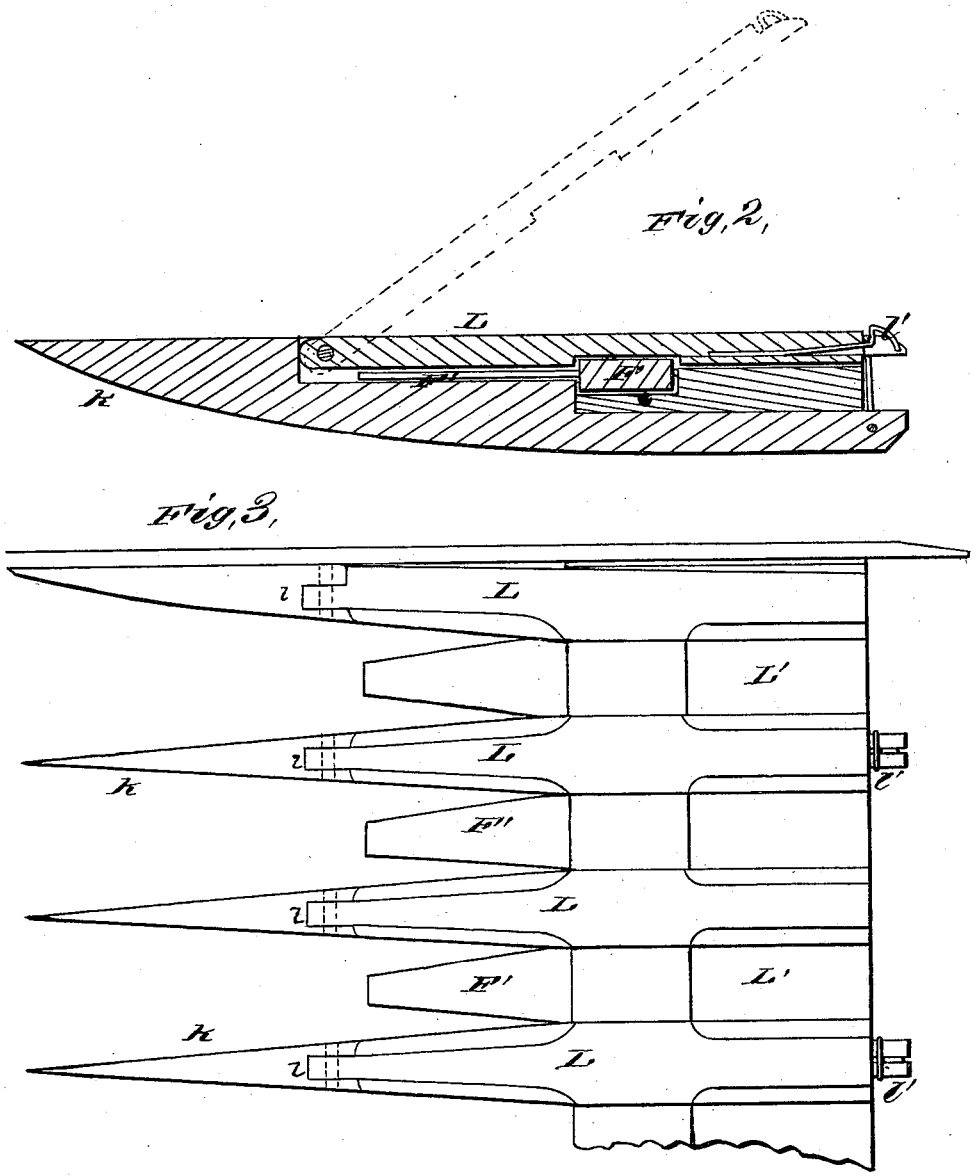

UNITED STATES PATENT OFFICE.

AMOS WALTER, OF MIDDLEBURY, INDIANA.

IMPROVEMENT IN HARVESTER-CUTTERS.

Specification forming part of Letters Patent No. 191,207, dated May 22, 1877; application filed July 1, 1876.

*To all whom it may concern:*

Be it known that I, AMOS WALTER, of Middlebury, in the county of Elkhart and State of Indiana, have invented a new and valuable Improvement in Cutter-Bars for Reapers and Mowers; and do hereby declare that the following is a full, clear, and exact description of the construction and operation of the same, reference being had to the annexed drawings, making a part of this specification, and to the letters and figures of reference marked thereon.

Figure 1 of the drawings is a representation of a plan view of my cutter-bar with the guards thrown back, and Fig. 2 is a transverse vertical sectional view of the same. Fig. 3 is a plan view with the guards fastened down.

This invention relates to improvements in cutters for field and lawn mowers and reapers; and it consists in so arranging the cutter-knives that they can be readily removed for cleaning and other purposes, and so that there will be no danger of dragging hay or straw between the guards, and thereby clogging the machine; also, in a system of hinged upper guards, which fold down between the cutter-knives, as hereinafter more fully set forth.

In the accompanying drawings, A represents a crank-shaft, adapted to be operated by the crank-wheel of a harvester or any analogous mechanism. Shaft A is journaled in sectional box B, which is rigidly secured to the harvester-frame, and the forward part of which is made cylindrical in shape, so that it may be adapted to allow bar C to be pivoted thereon. To the outer end of crank-shaft A is attached the end of pitman E, which reciprocates longitudinally, communicating the same motion to knife-connecting rod or bar F, through slots $f$, in which extend knives or sickles F'. These knives are not pivoted in said bar, and are provided at their rear ends with circular disks $f'$. To the end of bar C I rigidly attach a cross-block, G, which is hinged at $g$ $g$ to the inner shoe H on the inner end of finger-bar I.

The upper side of said finger-bar is provided with plate or offset J, which is recessed in front at $j\,j$, to allow the oscillations of said knives, and also at $j'\,j'$, corresponding to disks $f'\,f'$, so as to form pivots for said knives, a recess, $o$, being also made in the finger-bar I, in which the slotted cutter-bar F reciprocates.

K K are fingers, preferably made of cast-steel, attached to finger-bar I, and L L are guards, hinged to the fingers K K at $l\,l$, and which are adapted either to be raised, to facilitate the removal of the knives, or be closed upon fingers K, leaving a space, as usual, for the knives to operate in. L' is a frame or cross-piece connecting the rear of said guards, and provided with latches $l'$, for locking it to the finger-bar I.

The construction of my knives and of the fingers not only renders the former easily removable from the apparatus when it becomes necessary to clean or sharpen one or more of them, but also prevents grass, while mowing, from being drawn between the knives and the fingers, and clogging the apparatus.

What I claim as new, and desire to secure by Letters Patent, is—

1. The slotted cutter-bar F and the cutters F', having disks $f'$, in combination with the finger-bar I, plate J, having circular recesses for the reception of the disks, and hinged guards L, whereby the cutters can readily be removed from their seats for sharpening or other purposes, substantially as described.

2. The combination of fingers K K and hinged guards L L, adapted to be raised at will, or to be locked down, substantially as set forth.

In testimony that I claim the above I have hereunto subscribed my name in the presence of two witnesses.

AMOS WALTER.

Witnesses:
JOHN F. ACKER, Jr.,
G. W. JOHNSON.